United States Patent
Park et al.

(10) Patent No.: US 9,277,511 B2
(45) Date of Patent: Mar. 1, 2016

(54) METHOD OF SETTING UE MODE SWITCHING FOR RPD REDUCTION

(71) Applicant: ST-ERICSSON SA, Plan-les-Ouates (CH)

(72) Inventors: Chester Sungchung Park, San Jose, CA (US); Bjorn Anders Gustavsson, Lund (SE)

(73) Assignee: ST-Ericsson SA, Plan-les-Ouates (CH)

( * ) Notice: Subject to any disclaimer, the term of this patent is extended or adjusted under 35 U.S.C. 154(b) by 401 days.

(21) Appl. No.: 13/692,782

(22) Filed: Dec. 3, 2012

(65) Prior Publication Data

US 2014/0153456 A1   Jun. 5, 2014

(51) Int. Cl.
*H04W 52/38* (2009.01)
*H04W 52/28* (2009.01)
*H04W 52/22* (2009.01)
*H04W 52/32* (2009.01)

(52) U.S. Cl.
CPC ............ *H04W 52/38* (2013.01); *H04W 52/288* (2013.01); *H04W 52/223* (2013.01); *H04W 52/325* (2013.01)

(58) Field of Classification Search
None
See application file for complete search history.

(56) References Cited

U.S. PATENT DOCUMENTS

| 7,346,317 B2 | 3/2008 | Rahman et al. | |
|---|---|---|---|
| 8,000,663 B2 | 8/2011 | Flowers | |
| 2010/0113105 A1* | 5/2010 | Xu et al. | 455/572 |
| 2011/0243007 A1* | 10/2011 | Xiao | 370/252 |
| 2012/0224552 A1* | 9/2012 | Feuersanger et al. | 370/329 |
| 2012/0281650 A1* | 11/2012 | Ouchi et al. | 370/329 |
| 2013/0128833 A1* | 5/2013 | Lee et al. | 370/329 |
| 2013/0142098 A1* | 6/2013 | Kwon et al. | 370/311 |

OTHER PUBLICATIONS

Huawei, Hisilicon; On Relative Phase Discontinuity for UL-MIMO; R4-115940; 3GPP TSG-RAN WG4 Meeting #61; San Francisco, US, Nov. 14-18, 2011; 3 Pages.

Huawei, Hisilicon; Discussion on Phase Continuity for UL MIMO; R4-112035; 3GPP TSG-RAN WG4 Meeting #58AH; Shanghai, Apr. 11-15, 2011; 5 Pages.

Motorola Mobility; Issues in Practical Multi-Antenna Uplink Transmission; R1-112447, 3GPP TSG-RAN1 #66; Athens, Greece, Aug. 22-26, 2011; 4 Pages.

* cited by examiner

*Primary Examiner* — Brandon Renner
*Assistant Examiner* — Manuel Rangel
(74) *Attorney, Agent, or Firm* — Howison & Arnott, LLP

(57) ABSTRACT

A UE communication device is provided having a transmitter architecture that transmits SRS transmissions and PUSCH transmissions. A reference mode chosen from a LPM, an MPM and an HPM is selected based on a present power mode of the SRS transmission or based on a predicted power mode that the PUSCH transmission following the present SRS transmission will likely operate in. The transmitter architecture has an exemplary extended switching point structure allowing the RPD between the SRS transmission used for pre-quarter selection and the subsequent PUSCH transmission applying the pre-quarter to be minimized.

17 Claims, 7 Drawing Sheets

METHOD OF SETTING UE MODE SWITCHING FOR RPD REDUCTION

CROSS-REFERENCE TO RELATED APPLICATIONS

This application claims benefit of U.S. Provisional Application No. 61/566,532, filed Dec. 2, 2011, entitled UE MODE SWITCHING FOR RPD REDUCTION, the specification of which is incorporated herein in its entirety.

TECHNICAL FIELD

This invention relates to wireless communication mode switching. More particularly, embodiments of the invention relate to a communication device of Multiple-Input Multiple-Output (MIMO) operation that performs transmit mode switching for the Sounding Reference Signal (SRS) and Physical Uplink Shared Channel (PUSCH).

BACKGROUND

Multiple-Input Multiple-Output (MIMO) is one of the key elements of the air interface for high-speed wireless communications for many wireless communication technologies such as Long Term Evolution (LTE) and High Speed Packet Access (HSPA). MIMO can use the diversity in the channel to provide multiplexing gain by enabling the simultaneous transmission of multiple streams known as layers. Denoting the number of transmit antennas, receive antennas, and layers by $N_T$, $N_R$, and $R$, respectively, $R$ is never greater than $N_T$ (and, often, smaller or equal to $N_R$). One possible implementation of MIMO uses a precoder, often expressed mathematically as a left-multiplication of a layer signal vector ($R \times 1$) by a precoding matrix ($N_T \times R$), which is chosen from a pre-defined set of matrices, a so-called codebook exemplified in Table 1 and Table 2.

TABLE 1

Codebook for LTE UL (2-TX)

| PMI | RI 0 | RI 1 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

TABLE 2

Codebook for LTE UL (4-TX)

| PMI | RI 0 | RI 1 | RI 2 | RI 3 |
|---|---|---|---|---|
| 0 | $\frac{1}{2}\begin{bmatrix}1\\1\\1\\-1\end{bmatrix}$ | $\frac{1}{2}\begin{bmatrix}1 & 0\\1 & 0\\0 & 1\\0 & -j\end{bmatrix}$ | $\frac{1}{2}\begin{bmatrix}1 & 0 & 0\\1 & 0 & 0\\0 & 1 & 0\\0 & 0 & 1\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |
| 1 | $\frac{1}{2}\begin{bmatrix}1\\1\\j\\j\end{bmatrix}$ | $\frac{1}{2}\begin{bmatrix}1 & 0\\1 & 0\\0 & 1\\0 & j\end{bmatrix}$ | $\frac{1}{2}\begin{bmatrix}1 & 0 & 0\\-1 & 0 & 0\\0 & 1 & 0\\0 & 0 & 1\end{bmatrix}$ | — |
| 2 | $\frac{1}{2}\begin{bmatrix}1\\1\\-1\\1\end{bmatrix}$ | $\frac{1}{2}\begin{bmatrix}1 & 0\\-j & 0\\0 & 1\\0 & 1\end{bmatrix}$ | $\frac{1}{2}\begin{bmatrix}1 & 0 & 0\\0 & 1 & 0\\1 & 0 & 0\\0 & 0 & 1\end{bmatrix}$ | — |
| 3 | $\frac{1}{2}\begin{bmatrix}1\\1\\-j\\-j\end{bmatrix}$ | $\frac{1}{2}\begin{bmatrix}1 & 0\\-j & 0\\0 & 1\\0 & -1\end{bmatrix}$ | $\frac{1}{2}\begin{bmatrix}1 & 0 & 0\\0 & 1 & 0\\-1 & 0 & 0\\0 & 0 & 1\end{bmatrix}$ | — |
| 4 | $\frac{1}{2}\begin{bmatrix}1\\j\\1\\j\end{bmatrix}$ | $\frac{1}{2}\begin{bmatrix}1 & 0\\-1 & 0\\0 & 1\\0 & -j\end{bmatrix}$ | $\frac{1}{2}\begin{bmatrix}1 & 0 & 0\\0 & 1 & 0\\0 & 0 & 1\\1 & 0 & 0\end{bmatrix}$ | — |
| 5 | $\frac{1}{2}\begin{bmatrix}1\\j\\j\\1\end{bmatrix}$ | $\frac{1}{2}\begin{bmatrix}1 & 0\\-1 & 0\\0 & 1\\0 & j\end{bmatrix}$ | $\frac{1}{2}\begin{bmatrix}1 & 0 & 0\\0 & 1 & 0\\0 & 0 & 1\\-1 & 0 & 0\end{bmatrix}$ | — |
| 6 | $\frac{1}{2}\begin{bmatrix}1\\j\\-1\\-j\end{bmatrix}$ | $\frac{1}{2}\begin{bmatrix}1 & 0\\j & 0\\0 & 1\\0 & 1\end{bmatrix}$ | $\frac{1}{2}\begin{bmatrix}0 & 1 & 0\\1 & 0 & 0\\1 & 0 & 0\\0 & 0 & 1\end{bmatrix}$ | — |
| 7 | $\frac{1}{2}\begin{bmatrix}1\\j\\-j\\-1\end{bmatrix}$ | $\frac{1}{2}\begin{bmatrix}1 & 0\\j & 0\\0 & 1\\0 & -1\end{bmatrix}$ | $\frac{1}{2}\begin{bmatrix}0 & 1 & 0\\1 & 0 & 0\\-1 & 0 & 0\\0 & 0 & 1\end{bmatrix}$ | — |
| 8 | $\frac{1}{2}\begin{bmatrix}1\\-1\\1\\1\end{bmatrix}$ | $\frac{1}{2}\begin{bmatrix}1 & 0\\0 & 1\\1 & 0\\0 & 1\end{bmatrix}$ | $\frac{1}{2}\begin{bmatrix}0 & 1 & 0\\1 & 0 & 0\\0 & 0 & 1\\1 & 0 & 0\end{bmatrix}$ | — |
| 9 | $\frac{1}{2}\begin{bmatrix}1\\-1\\j\\-j\end{bmatrix}$ | $\frac{1}{2}\begin{bmatrix}1 & 0\\0 & 1\\1 & 0\\0 & -1\end{bmatrix}$ | $\frac{1}{2}\begin{bmatrix}0 & 1 & 0\\1 & 0 & 0\\0 & 0 & 1\\-1 & 0 & 0\end{bmatrix}$ | — |
| 10 | $\frac{1}{2}\begin{bmatrix}1\\-1\\-1\\-1\end{bmatrix}$ | $\frac{1}{2}\begin{bmatrix}1 & 0\\0 & 1\\-1 & 0\\0 & 1\end{bmatrix}$ | $\frac{1}{2}\begin{bmatrix}0 & 1 & 0\\0 & 0 & 1\\1 & 0 & 0\\1 & 0 & 0\end{bmatrix}$ | — |

TABLE 2-continued

Codebook for LTE UL (4-TX)

| PMI | RI 0 | RI 1 | RI 2 | RI 3 |
|---|---|---|---|---|
| 11 | $\frac{1}{2}\begin{bmatrix}1\\-1\\-j\\j\end{bmatrix}$ | $\frac{1}{2}\begin{bmatrix}1&0\\0&1\\-1&0\\0&-1\end{bmatrix}$ | $\frac{1}{2}\begin{bmatrix}0&1&0\\0&0&1\\1&0&0\\-1&0&0\end{bmatrix}$ | — |
| 12 | $\frac{1}{2}\begin{bmatrix}1\\-j\\1\\-j\end{bmatrix}$ | $\frac{1}{2}\begin{bmatrix}1&0\\0&1\\0&1\\1&0\end{bmatrix}$ | — | — |
| 13 | $\frac{1}{2}\begin{bmatrix}1\\-j\\j\\-1\end{bmatrix}$ | $\frac{1}{2}\begin{bmatrix}1&0\\0&1\\0&-1\\1&0\end{bmatrix}$ | — | — |
| 14 | $\frac{1}{2}\begin{bmatrix}1\\-j\\-1\\j\end{bmatrix}$ | $\frac{1}{2}\begin{bmatrix}1&0\\0&1\\0&1\\-1&0\end{bmatrix}$ | — | — |
| 15 | $\frac{1}{2}\begin{bmatrix}1\\-j\\-j\\1\end{bmatrix}$ | $\frac{1}{2}\begin{bmatrix}1&0\\0&1\\0&-1\\-1&0\end{bmatrix}$ | — | — |
| 16 | $\frac{1}{2}\begin{bmatrix}1\\0\\1\\0\end{bmatrix}$ | — | — | — |
| 17 | $\frac{1}{2}\begin{bmatrix}1\\0\\-1\\0\end{bmatrix}$ | — | — | — |
| 18 | $\frac{1}{2}\begin{bmatrix}1\\0\\j\\0\end{bmatrix}$ | — | — | — |
| 19 | $\frac{1}{2}\begin{bmatrix}1\\0\\-j\\0\end{bmatrix}$ | — | — | — |
| 20 | $\frac{1}{2}\begin{bmatrix}0\\1\\0\\1\end{bmatrix}$ | — | — | — |
| 21 | $\frac{1}{2}\begin{bmatrix}0\\1\\0\\-1\end{bmatrix}$ | — | — | — |
| 22 | $\frac{1}{2}\begin{bmatrix}0\\1\\0\\j\end{bmatrix}$ | — | — | — |
| 23 | $\frac{1}{2}\begin{bmatrix}0\\1\\0\\-j\end{bmatrix}$ | — | — | — |

Each precoding matrix is indexed by a rank indicator (RI) and a precoding matrix indicator (PMI). (Note that the r-th column vector of the precoding matrix represents the antenna spreading weight of the r-th layer.) The precoding matrix usually consists of linearly-independent columns, and thus R is referred to as the rank of codebook. One purpose of this kind of precoder is to match the precoding matrix with the channel state information (CSI) so as to increase the received signal power and also to some extent reduce inter-layer interference, thereby improving the signal-to-interference-plus-noise-ratio (SINR) of each layer. Consequently, the precoder selection requires the transmitter to know the channel properties and, generally speaking, the more accurate the CSI, the better the precoder matches.

In the case of 3GPP LTE UL, precoder selection is made by the receiver (NodeB) so that there is no need for feeding channel information back to the transmitter. The precoder selection includes not only rank selection, but also precoding matrix selection. It is also necessary for the receiver to obtain channel information, which can usually be facilitated by transmitting a known signal, in the case of LTE UL, the Demodulation Reference Signal (DM-RS) and the Sounding Reference Signal (SRS). Both DM-RS and SRS are defined in frequency domain and derived from a Zadoff-Chu sequence. However, since the DM-RS is precoded, while the SRS is not precoded, the channel information obtained from DM-RS is the equivalent channel that the R layers experience, not the physical channel that the $N_T$ antennas experience. Mathematically, letting the $N_R \times N_T$ physical channel matrix, the $N_T \times R$ precoding matrix, and the $N_R \times R$ equivalent channel be denoted by H, W and E, respectively, it follows that $$E = HDW, \quad (1)$$

where D is the $N_T \times N_T$ diagonal matrix whose diagonal elements represent a phase shift introduced by the transmitter chains. As will be seen later, the phase shift is not uniform and does not need to be constant. In detail, the i-th diagonal element is given as $d_i = \exp(j\phi_i)$. As will be described below, the phase shift may result in significant performance loss, when the relative phase between the transmitter chains changes from SRS to PUSCH.

Using the above notation, the equivalent channels for PUSCH, DM-RS and SRS denoted by $E_{PUSCH}$, $E_{DMRS}$ and $E_{SRS}$ can be expressed as $$E_{PUSCH} = HW$$

$$E_{DMRS} = HW$$

$$H_{SRS} = HD. \quad (2)$$

Here it is assumed that there is no channel variation among PUSCH, DM-RS and SRS. Furthermore, D is set to the identity matrix for PUSCH and DM-RS without loss of generality due to the fact that we are only concerned with relative phase variations. Note that it is also assumed that PUSCH and DM-RS experience the same channel. In addition, note that $H_{SRS}$ in (2) is directly obtained from SRS, and based on $H_{SRS}$ the equivalent channel $E_{SRS}$ as a function of a hypothesized precoder W can be obtained as $E_{SRS}=H_{SRS}W$.

Precoder selection is preferably based on SRS, since precoder selection is more easily done with complete knowledge of the channel, i.e., the physical channel, HD in (2). Based on the physical channel estimated based on SRS, the best transmission mode is chosen by the receiver. The receiver then sends the chosen best channel to the transmitter. One of the criteria of selecting the transmission mode is to maximize the data throughput. For example, the effective SNR is calculated for each precoder, i.e., each selection of the rank and precoder matrix, the relevant throughput is calculated, and the precoder maximizing the throughput is selected. Consequently, it is easily understood that precoder selection is subject to inter-antenna imbalance variation between measurement period (SRS) and actual data transmission period (PUSCH).

Referring to FIG. 1, consider a generic User Equipment (UE) 100 with two transmit antennas 102, 104 for simplicity (although the following argument is equally applicable to a UE with more than two transmit antennas). Furthermore, throughout this document a UE 100 can be any one of a multitude of types of wireless or mobile communication devices. Furthermore, a UE as used herein, but not specifically shown in FIG. 1, may include a user interface for physical touch, sound and/or vision. Additionally, a UE inherently comprises one or more controller or microcontroller devices 112 and related circuitry adapted to perform, among other things, mode switching of the one or more transmitter (TX) branches 106, 108 within a transmitter architecture 110.

Denoting the absolute phases of transmitter branch #1 106 and #2 108 by $\phi_1(t)$ and $\phi_2(t)$, respectively, the relative phase (RP) is defined as $\delta\phi(t)=\phi_1(t)-\phi_2(t)$. Then the relative phase discontinuity (RPD) is defined as the difference of RP between two time instants $t_1$ and $t_2$, i.e., $\delta\phi(t_1)-\delta\phi(t_2)$.

The RPD of a transmitter branch typically comprises a power-dependent term and a time-dependent term. The power-dependent term depends on the transmit power, whereas the time-dependent term varies with time. From the viewpoint of modelling, the power-dependent term can be given as a function of the current transmit power, whereas the time-dependent term can be given as an additive random process.

The power-dependent RPD mainly comes from the power/configuration mode switching by which each transmitter branch switches the gain/bias state. The potential sources of the power-dependent RPD can be summarized as follows:

Power mode switching: Many state-of-the-art Power Amplifiers (PAs) switch the power mode according to the transmit power, in order to improve the power efficiency. Without extra design effort (or additional circuitry), the two transmitter branches 106, 108 tend to respond to the power mode switching differently, thereby resulting in RPD across the switching points.

Configuration mode switching: Depending on the transmit power, the RF/ABB switches the configuration modes characterized by gain switching, adaptive biasing, signal path switching etc. in order to reduce the power consumption. Without extra design effort (or additional circuitry), it is likely that the two transmitter branches experience different phase variation across the switching points. Therefore, the transmitter tends to experience non-negligible RPD in case of configuration mode switching.

AM-to-PM distortion: Since PAs are typically operated around the compression point to maximize the power efficiency; they may experience non-negligible AM-to-PM distortion without additional circuitry (e.g., digital pre-distortion). It is likely that the two PA devices have slightly different compression points, operate at slightly different power and operate under different loading conditions. This causes different distortion in the transmitter branches and consequently the transmitter tends to experience non-negligible RPD.

When it comes to precoder selection, the RPD between the measurement and the relevant precoding are the most important considerations. Recalling that SRS is a natural choice for precoder selection, the importance of the RPD between the SRS transmission used for precoder selection and the subsequent PUSCH transmission applying the precoder is easily understood. The RPD may lead to non-optimal precoder selection, even when the wireless channel is perfectly known to the Node B. This may result in non-trivial performance loss, since the precoder selection typically relies on the phase information of the transmitter chains.

It follows that the time frame of interest is about a few (or a few tens of) subframes. It depends on the processing time (measurement and precoder selection) and the SRS periodicity. For example, if the processing time is 4 msec and the period of SRS transmission is 10 msec, a minimum of 8 msec and a maximum of 18 msec should be assumed as the time frame. Given such a time frame, the power-dependent term has a larger impact on RPD than the time-dependent term and thus there is a need to focus on the power-dependent term, i.e., how to cope with it, in some embodiments of this invention.

Denoting the current transmit power by P(t), the absolute phase is given as $$\phi_1(t)=f_1(P(t))$$

$$\phi_2(t)=f_2(P(t)), \quad (1)$$

where $f_1(x)$ and $f_2(x)$ represent the power dependence of absolute phase for the two transmitter branches. This is exemplified in FIG. 2. Defining the power dependence of RP as $f_{1,2}(x)=f_1(x)-f_2(x)$, the corresponding RP is given as $$\delta\phi(t)=f_{1,2}(P(t)). \quad (2).$$

This is further exemplified in FIG. 3. In other words, the Relative Phase (RP) is given as a function of the current transmit power. Similarly, the RPD between $t_1$ and $t_2$ is given as $$\delta\phi(t_1)-\delta\phi(t_2)=f_{1,2}(P(t_1))-f_{1,2}(P(t_2)) \quad (2)$$

Therefore, the RPD is given as a function of the transmit powers of the two time instants. In other words, it is the transmit power change that gives rise to the RPD. For example, there exists no RPD, if the transmit power remains constant, i.e., $P(t_1)=P(t_2)$. It is also found out that, given a certain level of transmit power change, the resulting RPD is determined by the power-dependence of the RP. For example, when the RP is independent of the transmit power, i.e., $f_{1,2}(P)=C$ (constant), there exists no RPD.

FIG. 4 shows an example of the relationship between transmit power and the RP. It is shown that RP changes abruptly across, for example, two transmit power levels of 0 dBm and 10 dBm—referred to as switching points (or switching point power levels) hereafter. In this example of FIG. 4, there are two switching points 402, 404 whose power levels are 0 dBm (a low default switching point power level) and 10 dBm (a high default switching point power level). There are three operation modes: the operation mode below 0 dBm is called Low-Power Mode (LPM) 406, the operation mode between 0 dBm and 10 dBm is called Mid-Power Mode (MPM) 408 and the operation mode above 10 dBm is called High-Power Mode (HPM) 410. Each mode has its own bias state and the phase of a bias state is not necessarily equal to those of other bias sates. This justifies the aforementioned RP change across the switching points. In other words, the transmit power change causes the UE or the controller 112 to mode switch the UE transmitter 110 and the mode switching in turn causes the RPD.

Every time a UE operates across a switching point 402, 404, the operation mode changes, thereby creating RPD. What is needed is a method of mode switching that can be used to alleviate or decrease the occurrence of RPD. Additionally, what is needed is a method of mode switching that eliminates unnecessary mode switches and thereby alleviates, decreases or reduces RPD. Furthermore, what is needed is a method of mode switching that can avoid unnecessary mode switching between SRS and PUSCH and thus mitigate the RPD between SRS and PUSCH.

SUMMARY

Embodiments of the invention provide a method of mode switching that can be used to alleviate or decrease the occurrence of RPD. Embodiments provide a method of mode switching the helps to eliminate unnecessary mode switches and thereby alleviate, decrease or reduce RPD. Furthermore, exemplary methods of mode switching extend the range of the mode used for SRS to thereby avoid unnecessary mode switching between SRS and PUSCH, which mitigates the RPD between SRS and PUSCH. As such, an exemplary embodiment can select the SRS mode depending on which mode the following PUSCH is most likely to operate in.

In one embodiment of the invention, a User Equipment (UE) is provided that comprises a transmitter architecture adapted to transmit SRS transmissions and PUSCH transmissions and a controller adapted to interact with and control the transmitter architecture to switch between three transmission power modes and to transmit each SRS transmission and PUSCH transmission while in at least one of the three power modes; wherein the three power modes comprise a Low Power Mode (LPM), a Mid Power Mode (MPM), and a High Power Mode (HPM). The controller is further adapted to select a reference mode from one of the plurality of power modes each time an SRS transmission occurs. The reference mode for transmitting the SRS is selected based on the power mode that the SRS transmission belongs to or is selected based on a predicted power mode that the PUSCH transmission following the SRS transmission will likely operate within or belong to. When the selected reference mode is LPM, the controller is adapted to control the transmitter architecture to switch between at least two of the plurality of power modes at a low default switching point power level between LPM and MPM. Alternatively, when the selected reference mode is MPM, the controller is adapted to control the transmitter architecture to switch between at least three of the plurality of power modes at a low extended switching point power level between LPM and MPM and at the high default switching power level between MPM and HPM. Additionally, when the selected reference mode is HPM, the controller is adapted to control the transmitter architecture to switch between at least two of the plurality of power modes a high extended switching point power level between MPM and HPM. The low extended switching point power level is lower than the low default switching point power level and the high extended switching point power level is lower than the high default switching point power level. Furthermore, the low default switching point power level is lower than the high default switching point power level.

In some embodiments, the SRS transmission comprises transmission of a portion of one subframe and the PUSCH transmission comprises transmission of a plurality of sequential subframe portions.

In some embodiments, the predicted power mode that the PUSCH transmission following the present SRS transmission will likely operate in is based on PUSCH transmission history.

In some embodiments, the reference mode is selected based on the predicted power mode that the PUSCH transmission that follows the occurring SRS transmission will likely operate within when the predicted power mode is different than the present power mode of the SRS transmission.

In additional embodiments, when the selected reference mode is MPM, the controller is further configured to provide a subframe counter configured to count each PUSCH transmission subframe within a lower hysteresis region of the MPM and between two consecutive SRS transmissions, wherein the lower hysteresis region of the MPM is the power region between the low default switching point power level and the low extended switching point power level.

In additional embodiments, when the counter counts a predefined number of PUSCH subframes within the lower hysteresis region, then the reference mode is switched from MPM to LPM until a next SRS transmission.

In additional embodiments, when the selected reference mode is HPM, controller is further configured to provide a subframe counter configured to count each PUSCH transmission subframe within a lower hysteresis region of the HPM and between two consecutive SRS transmissions. The lower hysteresis region is the HPM is the power region between the high default switching point power level and the high extended switching point power level.

In additional embodiments, when the counter counts a predefined number of PUSCH subframes within the lower hysteresis region, the reference mode is switched from HPM to MPM until a next SRS transmission.

In some embodiments, the low default switching point power level is 0 dBm; wherein the low extended switching power level is −3 dBm; wherein the high default switching power level is 10 dBm. Furthermore, the high extended switching power level is 7 dBm.

In another exemplary embodiment of the invention, a UE device is adapted to transmit SRS transmissions and PUSCH transmissions while in at least one of three power modes. The three power modes comprise a Low Power Mode (LPM), a Mid Power Mode (MPM), and a High Power Mode (HPM). The invention further includes a method of switching between a plurality of power modes. The method of switching between the plurality of power modes comprises selecting, by the UE, a reference mode from on of the plurality of power modes each time the SRS transmission occurs. The selecting of the reference mode further comprises selecting the reference mode based on the power mode that the SRS transmission belongs within or selecting the reference mode based on a predicted power mode that the PUSCH transmission following the present SRS transmission will likely or belong within. Additionally, when the selected reference mode is LPM, switching by the UE occurs at least at a low default switching point power level between LPM and MPM. When the selected reference mode is MPM, switching by the UE between there of the plurality of power modes occurs at a low extended switching point power level between LPM and MPM and at the high default switching power level between MPM and HPM. Also, when the selected reference mode is HPM, switching the power mode by the UE at least at a high extended switching point power level between MPM and HPM. The high default switching point power level is greater than the high extended switching point power level, which is greater than the low default switching point power level, which is greater than the low extended switching point power level.

In additional embodiments, when selecting the reference mode is based on a predicted power mode that the PUSCH transmission following the SRS transmission will likely operate in comprises using PUSCH transmission history to predict the predicted power mode that the PUSCH transmission following the occurring SRS transmission with likely operate within.

In additional embodiments, selecting the reference mode further comprises selecting the reference mode based on the predicted power mode when the predicted power mode is different from the power mode that the SRS transmission belongs within.

In additional embodiments, selecting the reference mode further comprises selecting the reference mode based on the present power mode of the present SRS transmission when the predicted power mode is the same as the power mode that the SRS transmission belongs within.

In other embodiments of the invention, the UE/controller is adapted to count, when the selected reference mode is MPM, a number of PUSCH transmission subframes that are within a lower hysteresis region of the MPM and are between two consecutive SRS transmissions. The lower hysteresis region of the MPM is defined by the power region between the low default switching point power level and the low extended switching point power level.

In other embodiments, the UE/controller switches from MPM to LPM until a next SRS transmission when the number of counted PUSCH transmission subframes equals a predetermined number.

In other embodiments, the UE/controller counts, when the selected reference mode is HPM, a number of PUSCH transmission subframes that are within a lower hysteresis region of the HPM and are between two consecutive SRS transmissions. The lower hysteresis region of the HPM is defined by the power region between the high default switching point power level and the high extended switching point power level.

In other embodiments, the UE/controller switches from HPM to MPM until a next SRS transmission when the number of counted PUSCH transmission subframes equal a predetermined number.

BRIEF DESCRIPTION OF THE DRAWINGS

For a more complete understanding, reference is now made to the following description taken in conjunction with the accompanying Drawings in which.

DETAILED DESCRIPTION

Figure 1:
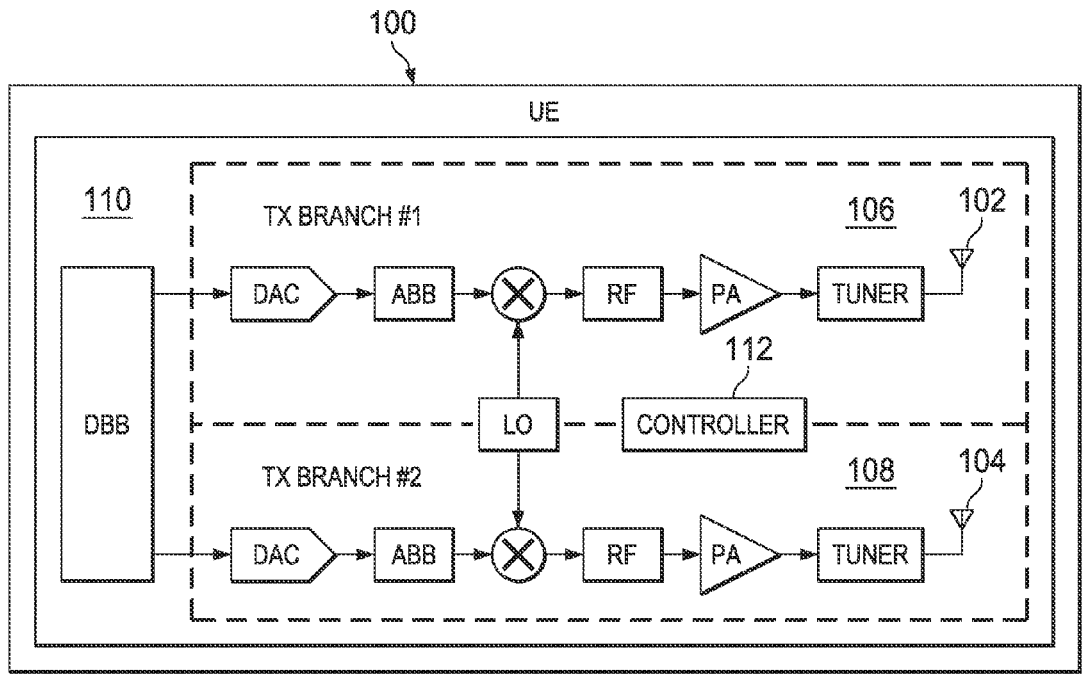
FIG. 1 illustrates a UE device.
Figure 2:
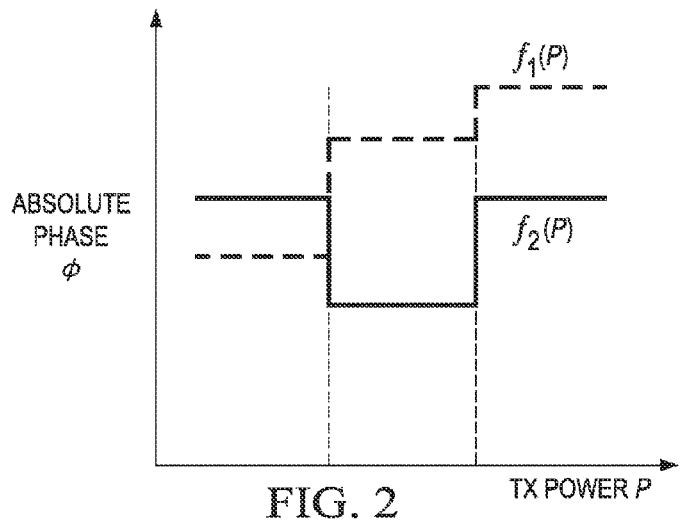
FIG. 2 illustrates the relationship between transmit power and absolute power.
Figure 3:
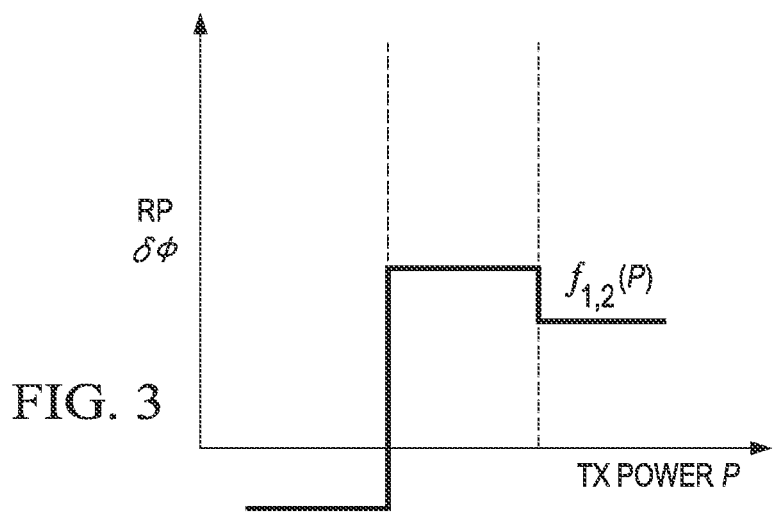
FIG. 3 illustrates the relationship between transmit power and relative phase.

Referring now to the drawings, wherein like reference numbers are used herein to designate like elements throughout, the various views and embodiments of a method of setting UE mode switching for RPD reduction are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Although the uplink channel of 3GPP LTE is assumed herein to exemplify embodiments of the invention, this should not be seen as limiting the scope of the invention to only the aforementioned 3GPP LTE system. Other wireless systems, including WCDMA, WiMax, UMB, GSM and WLAN, may also benefit from exploiting the ideas presented within this document.

Terminologies used herein, such as NodeB and UE should be considered non-limiting and do not imply a certain hierarchical relation between the two; in general, "NodeB" could be considered as device 1 and "UE" device 2, and these two devices communicate with each other over some radio channel.

As discussed above in FIG. 4, every time a UE operates across a switching point 402, 404, the operation mode changes, thereby creating RPD. However, referring now to FIGS. 5A, 5B and 5C, it has been found that by extending the range of a current mode (i.e., LPM, MPM and/or HPM), it is possible to avoid the mode switching around the switching points (switching point power levels) and thus alleviate the RPD occurrence. The exemplary range extension is done by lowering the lower switching point of the reference mode. The power region between an old switching point and a new switching point is referred to as a hysteresis region. Consequently, the range extension can be seen as the extension into a lower hysteresis region. Specifically as shown in FIG. 5A, if the reference mode is LPM, then no range extension is possible since there can be no lower switching point in the LPM mode. Thus, the switching points in the LPM mode are the low default and high default switching points 502, 504 respectively. In FIG. 5B, it is shown that, if the reference mode is MPM, then the range of the MPM can be extended from 0 dBm (the low default switching point power level), into the lower hysteresis region (−3 dBm~0 dBm) with a lower extended switching point power level 506 of the MPM being changed to −3 dBm with the high default switching point power level 504 remaining unchanged. Furthermore as shown in FIG. 5C, if the reference mode is HPM, the range of HPM is extended from the high default switching point of the HPM 504 10 dBm, into the upper hysteresis region of HPM 510 (7 dBm~10 dBm) with the new lower extended switching point of the HPM 508 being 7 dBm.

It should be noted that extending a lower switching point of a reference mode to a lower power switching point (i.e., extending the mode range) leads to unnecessary power consumption by the PA in the UE transmitter 110, since the exemplary method always selects an operation mode with higher power in the lower hysteresis region. For example, if the reference mode is MPM and a UE operates in the lower hysteresis region of MPM 512 (−3 dBm~0 dBm), the range extension always selects MPM, although the power efficiency is maximized in LPM and therefore the power consumption is minimized in LPM.

The mode switching of conventional range extension selects the current mode as the reference mode of range extension. This can reduce the mode switching frequency between consecutive subframes and thus the RPD between consecutive subframes. The receiver performance may benefit from such mode switching, if it is determined by the RPD between consecutive subframes. For example, when channel estimation uses inter-subframe interpolation, the receiver performance may be affected by the RPD between consecutive subframes.

Figure 6:
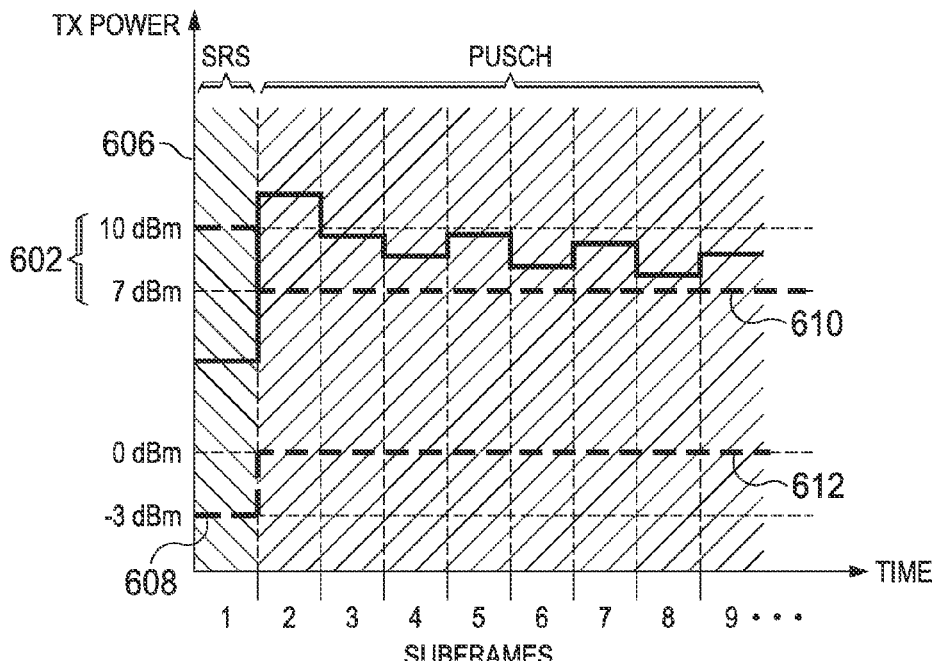
FIG. 6 illustrates UE mode switching with conventional range extension.

However, the receiver performance for LTE UL is determined by not the RPD across consecutive subframes, but instead by the RPD between SRS and PUSCH. More specifically, LTE UL performance is determined by the RPD between the SRS transmission used for precoder selection and the subsequent PUSCH transmission applying the precoder. Hence, the mode switching of conventional mode range extension (whose reference mode is set to the current mode) does not necessarily improve the LTE UL performance. Let's look at an example. FIG. 6 shows a typical scenario (over 9 subframes) where an SRS transmission, which is the first subframe, is followed by a PUSCH transmission comprising the second through ninth subframes. The PUSCH transmission comprises a different transmit power than the SRS. (Note that, for simplicity, it is assumed that SRS occupies the whole subframe, though it occupies only the last SC-FDMA symbol.) In the figure, the SRS power is 4 dBm, and the PUSCH power starts in the second subframe with 12 dBm and stays in the upper hysteresis region (7 dBm~10 dBm) 602. At the first subframe, the current mode is MPM as denoted by the high default switching power level 606 and the low extended switching point power level 608 between LPM and MPM. Thus, the mode range extension sets the upper switching point 606 of MPM to 10 dBm. Since the PUSCH power (12 dBm) is higher than 10 dBm at the second subframe, in conventional range extension systems the UE switches the mode from MPM to HPM as denoted by the HPM switching point line 610. Thus, at the second subframe, since the current mode is HPM the range extension sets the high extended switching point 610 of HPM to 7 dBm and the low default switching point 612 to 0 dBm. The PUSCH power (9.5 dBm) is higher than 7 dBm at the third subframe, which does not trigger the mode switching. In fact, the UE stays in HPM, as long as the transmit power is higher than the 7 dBm high extended switching point power level 610, as indicated. It is important to note that in this mode switching of conventional mode range extension the RPD between SRS and PUSCH occurs during every subframe, since the UE transmitter 110 operates in MPM for SRS, while the UE transmitter 110 also operates in HPM for the following PUSCH. Therefore, it can be concluded that the mode switching of conventional mode range extension may cause some performance loss when compared with the mode switching without range extension (e.g., FIG. 4). It should also be noted that the UE (i.e., the UE transmitter) can operate in MPM for all the subframes except the second one in this example, which is beneficial in terms of RPD as well as power consumption. This observation is a motivation for some embodiments of the present invention.

Figure 7:
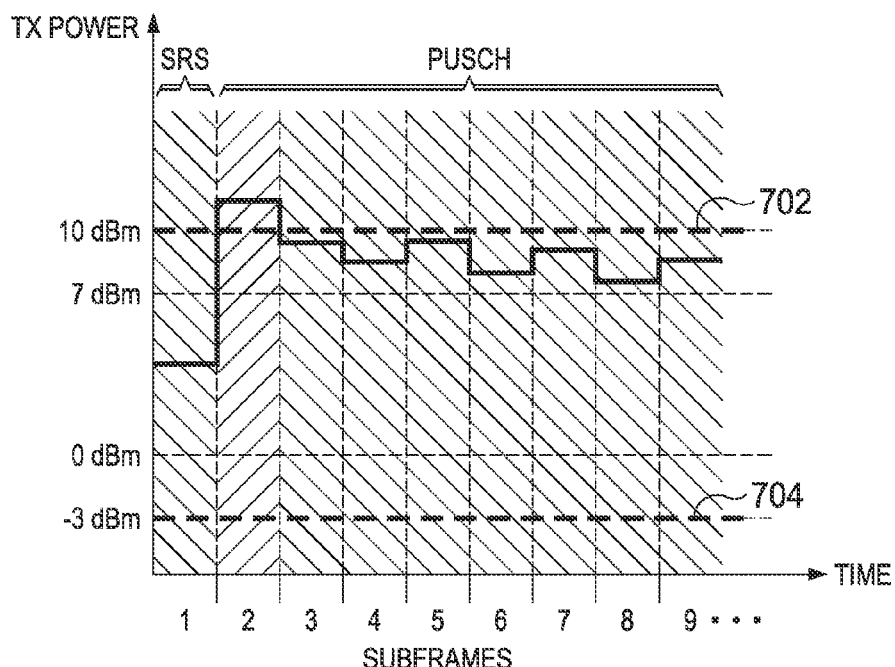
FIG. 7 illustrates UE mode switching with exemplary range extension.

In a first embodiment of the exemplary method of UE mode switching that reduces RPD, the reference mode is set to the mode used for SRS (i.e., the power mode that the SRS transmission is actually operating in or belongs within), thus the mode range extension in a hysteresis region avoids unnecessary mode switching between SRS and PUSCH. The reference mode is understood to be the power mode with which the SRS transmission actually operates. This means that in the case of the SRS transmission, the transmitter architecture should actually be switched to the reference mode (Otherwise, there is no point of having a reference mode). In the example of FIG. 7, the reference mode is set to MPM because the SRS power is at 4 dBm in the first subframe. Hence, the selected reference mode is MPM with a high default switching point 701 between MPM and HPM of 10 dBm and the low extended switching point 704 between LPM and MPM at −3 dBm. Consequently, the UE transmitter operates in MPM after the second subframe, as illustrated in FIG. 7, since the PUSCH power is above 10 dBm in the second frame, and then lower than 10 dBm in the third subframe. Thus, in this example the RPD between SRS and PUSCH exists only during the second subframe. Note that in this first embodiment the mode switching sets the reference mode every SRS transmission, whereas the mode switching of conventional range extension (FIG. 6), sets the reference mode every subframe. In other words, the reference mode of the range extension is switched in this first embodiment only when a SRS transmission occurs. In actuality, the SRS transmission occurs every N subframes. Since the SRS transmission is known to the UE 100 and hence, the UE transmitter architecture 110, it is straightforward to set the reference mode to the mode used for each SRS.

Figure 4:
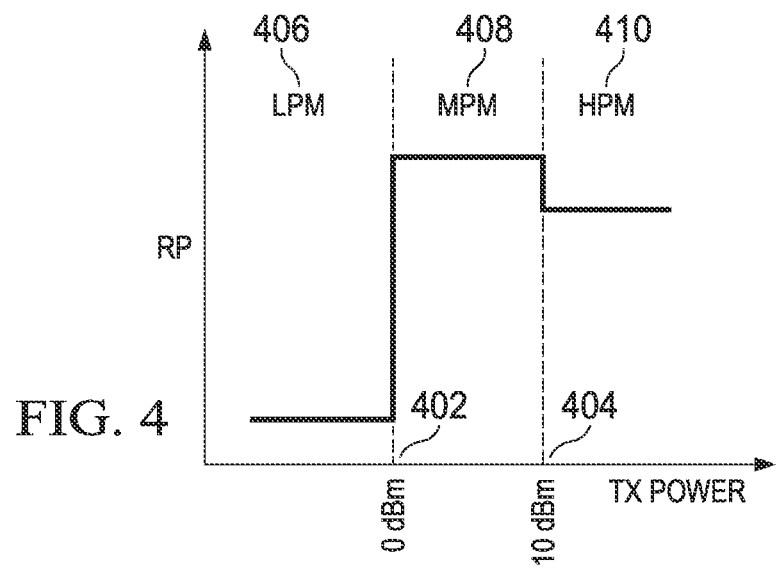
FIG. 4 illustrates UE operation modes LPM, MPM and HPM.
Figure 5:
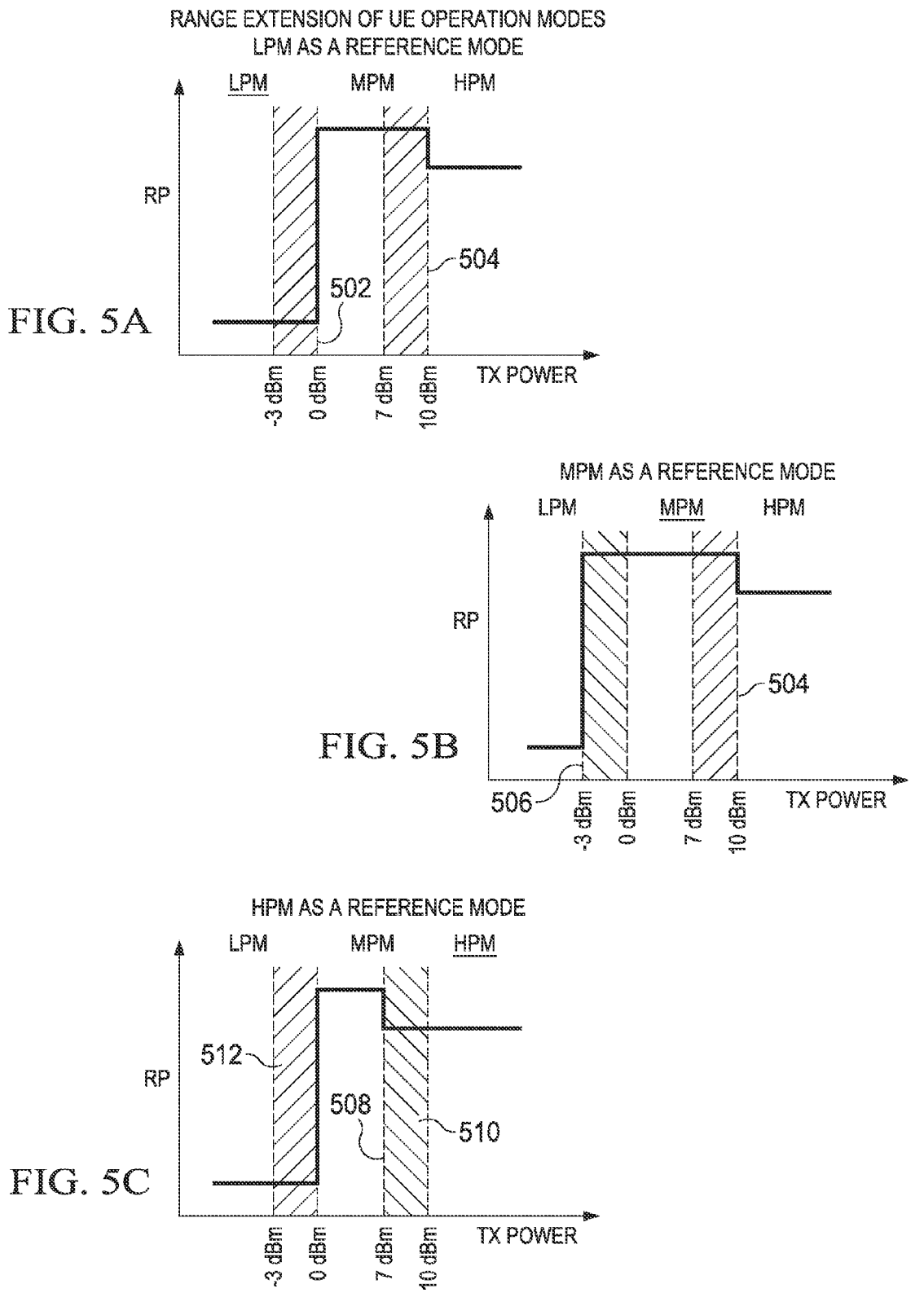
FIGS. 5A, 5B and 5C illustrate range extension of an UE/transmitter architecture wherein LPM, MPM and HPM are the reference modes, respectively.
Figure 8:
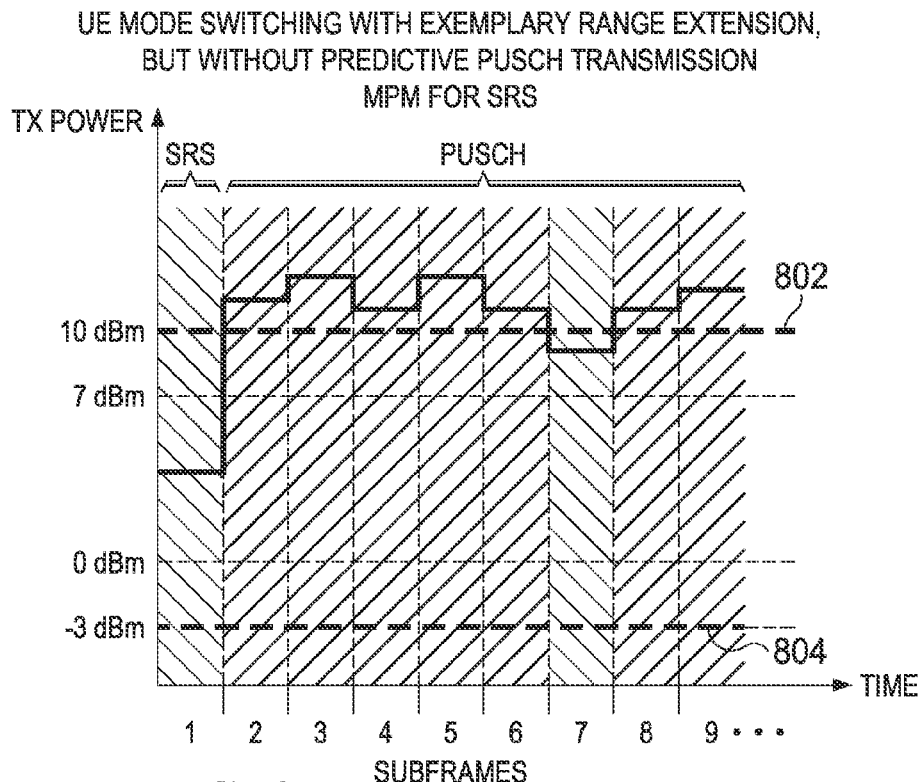
FIG. 8 illustrates UE mode switching with exemplary range extension, but without predictive PUSCH transmission.
Figure 9:
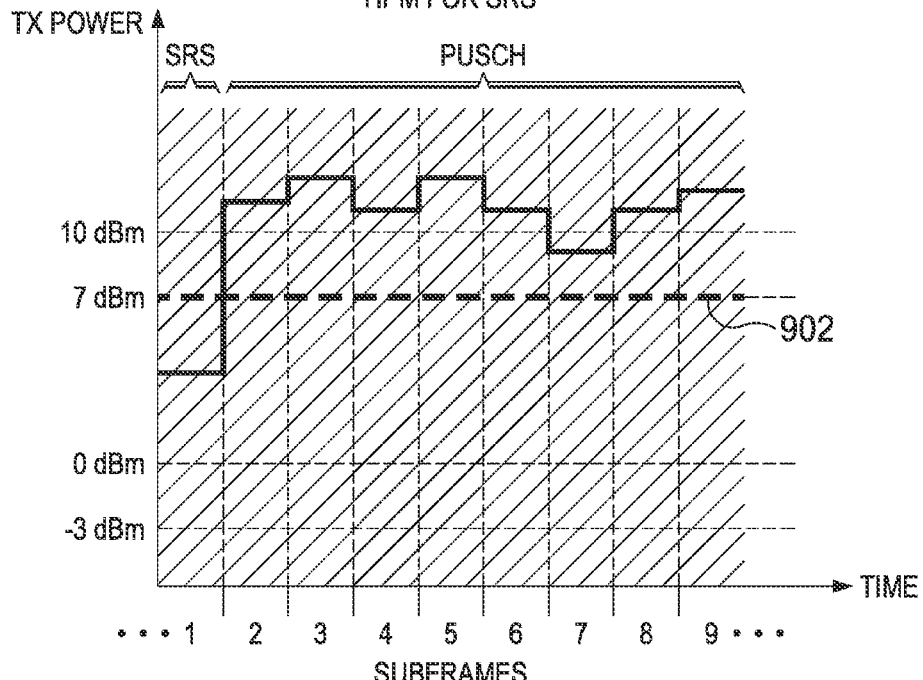
FIG. 9 illustrates UE mode switching with exemplary range extension and predictive PUSCH transmission.

Up to now, it has been assumed that the mode used for SRS, i.e., the reference mode of the range extension, is selected based on the mode switching without conventional range extension (e.g., FIG. 4). This minimizes the power consumption during SRS transmission. However, it is possible in an exemplary embodiment to select the mode for SRS depending on which mode the following PUSCH transmission is most likely to operate in. The UE or controller may determine what mode the following PUSCH is most likely to operate in based on the history or trends of one or more previous PUSCH subframe transmissions. Although selecting the mode for the SRS based on which mode the following PUSCH is most likely to operate in may result in power consumption increase for the SRS subframe transmission, the contribution to the total power consumption is mostly negligible, when the SRS period is longer than a few ten subframes. For example, with an SRS period of 10 subframes, the non-optimal mode is selected for only 0.7% of the time. When the mode for SRS is set to the mode most likely for PUSCH, the resulting RPD can be mitigated. This is illustrated in FIGS. 8 and 9, where in FIG. 8 (like in FIG. 7) the reference mode is set to the mode used for SRS based on the mode switching with exemplary range extension, but without a determination on which mode the PUSCH following the SRS is most likely to operate in. As such the reference mode is set to MPM with a high default switching point 802 set to 10 dBm between MPM and HPM and a low extended switching point 804 set to −3 dBm between MPM and LPM. Since the mode for PUSCH is mostly HPM (e.g., subframes 2-6, 8 and 9), then the RPD between SRS and PUSCH also occurs most of the time (except in the seventh subframe) in this example.

However, as shown in FIG. 9, in an embodiment wherein the UE or controller determines, based on, for example, that one or more previous PUSCH transmissions are operating in a mode other than the mode of the present SRS most of the time or that the mode for SRS is to be set based on the mode that the following PUSCH is most likely to operate in, then the reference mode can be set to a switching mode other than the switching mode of the present SRS. In other words if the UE/controller determine predictively that the following PUSCH transmission will likely operate in a mode other than and higher than the present SRS power level, then the predictive mode will be used for the reference mode and transmission of the SRS. In FIG. 9, although the present SRS indicates that the mode that should be used is MPM, the UE/controller used PUSCH history, trends or otherwise determines that the upcoming PUSCH transmission is most likely to operate HPM. As such, since HP is a higher energy mode, instead of using the mode of the present SRS (i.e., MPM) the SRS mode is set to HPM and the high extended switching point 902 is set to 7 dBm, which of course is the high extended switching point between MPM and HPM. As a consequence, in this example as compared to the example of FIG. 8, the mode for PUSCH is HPM and the RPD between the SRS and the PUSCH does not occur. Again, it is possible for the UE to predict the mode mostly likely for the following PUSCH to transmission in, for example, based on the history of previous PUSCH transmissions, when the PUSCH power is not changing rapidly. In other words, in embodiments of the invention, the reference mode is selected based on (1) the SRS power level or (2) some prediction based on the PUSCH power level. In detail, (1) the power mode that the SRS power level belongs to or (2) the power mode that the power level that the following PUSCH transmission is likely to belong to.

Figure 10:
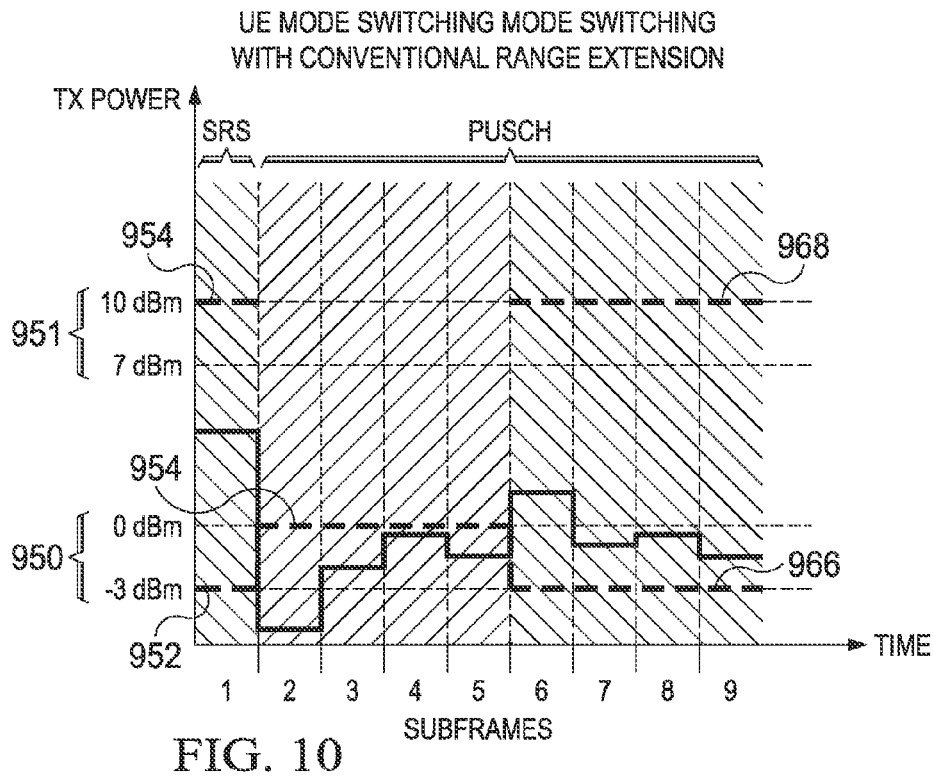
FIG. 10 illustrates another example of UE mode switching with conventional range extension.

As pointed out above, the range extension may increase the power consumption, since the method always selects a reference mode with higher power in the lower hysteresis region 950. For example FIG. 10 depicts a UE mode switching with conventional range extension and operating similar to the UE of FIG. 6. Here, mode switching with conventional range extension selects the current mode as the reference mode of range extension. Thus, in subframe 1, the mode for SRS is MPM due to the SRS power being 4 dBm. The PUSCH power starts at −4 dBm and then stays mainly within the lower hysteresis region (0 dBm~−3 dBm) 950. At the first subframe, the current mode is MPM and thus the conventional range extension sets the lower switching point of MPM to −3 dBm (i.e., the extended switching point between LPM and MPM) 952 and the upper switching point to 10 dBm (i.e., the default switching point between MPM and HPM) 954. Since at the second subframe the PUSCH power (−4 dBm) is lower than the low extended switching point between LPM and MPM (−3 dBm) 952, the UE/controller switches the mode from MPM to LPM. Therefore, at the second subframe, the current mode is LPM and thus the conventional range extension sets switching point of LPM to the default switching point between LPM and MPM (0 dBm) 954. Then at the sixth subframe the PUSCH power (1 dBm) is higher than the LPM default switching point 954 and thus, the UE/controller senses this and switches the mode from LPM back to MPM with the switching the conventional range extension setting the lower extended switching point 966 of MPM to −3 dBm (i.e., the low extended switching point between LPM and MPM) 966 and the high default switching point 968 to 10 dBm (i.e., the default switching point between MPM and HPM) 968.

Here in FIG. 10, the UE is operating mainly in the lower hysteresis region 950 where the range extension may increase power consumption since the UE/controller selects the mode having the higher power in a hysteresis region 950 or 951. Additionally, the RPD between SRS and PUSCH occurs in subframes 2-5. Thus power consumption is further increased.

Figure 11:
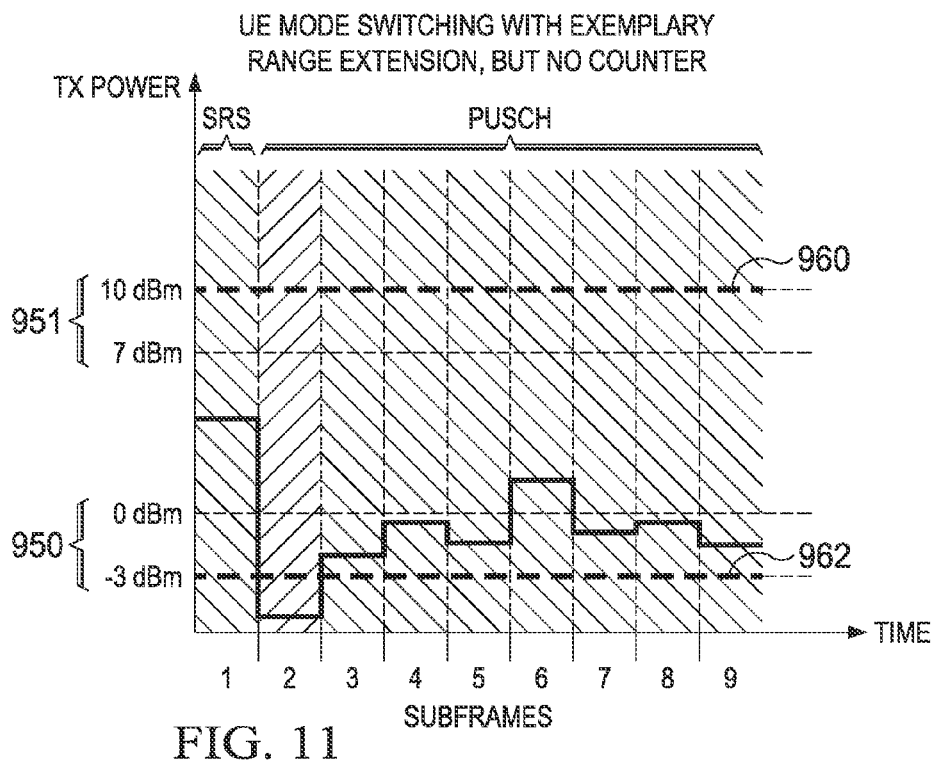
FIG. 11 illustrates UE mode switching with exemplary range extension, but without an exemplary counter.

In FIG. 11, an exemplary method of UE mode switching with exemplary range extension (but without the use of a counter) is depicted to show how the exemplary method can help eliminate the RPD between SRS and PUSCH, but may not be effective in mitigating the increase in power consumption due to the PUSCH power being mainly within the lower hysteresis region 950. Using the same SRS and PUSCH power signals from FIG. 10, but applying the exemplary range extension wherein the reference mode is set to the mode used for the SRS. As such the reference mode is set to MPM with an upper switching point 960 set to 10 dBm (i.e., the high default switching point between MPM and HPM) 960 and a lower switching point 962 set to −3 dBm (i.e., the extended switching point between MPM and LPM) 962. The exemplary mode switching extends MPM into the lower hysteresis region (−3 dBm~0 dBm) 950 and helps reduce the RPD between SRS and PUSCH in FIG. 11 as compared to the conventional mode switching with conventional range extension of FIG. 10. However, the exemplary mode switching results in unnecessary power consumption, since it always selects MPM in the lower hysteresis region 950 (instead of LPM) thereby failing to minimize the power consumption. The resulting power consumption increase may be problematic, for example, if the PUSCH power stays in the lower hysteresis region 950 for a long time or for many subframes. It had been determined that it is possible to alleviate a significant portion of the power consumption increase by setting a maximum allowable time or number of subframes for the range extension.

Figure 12:
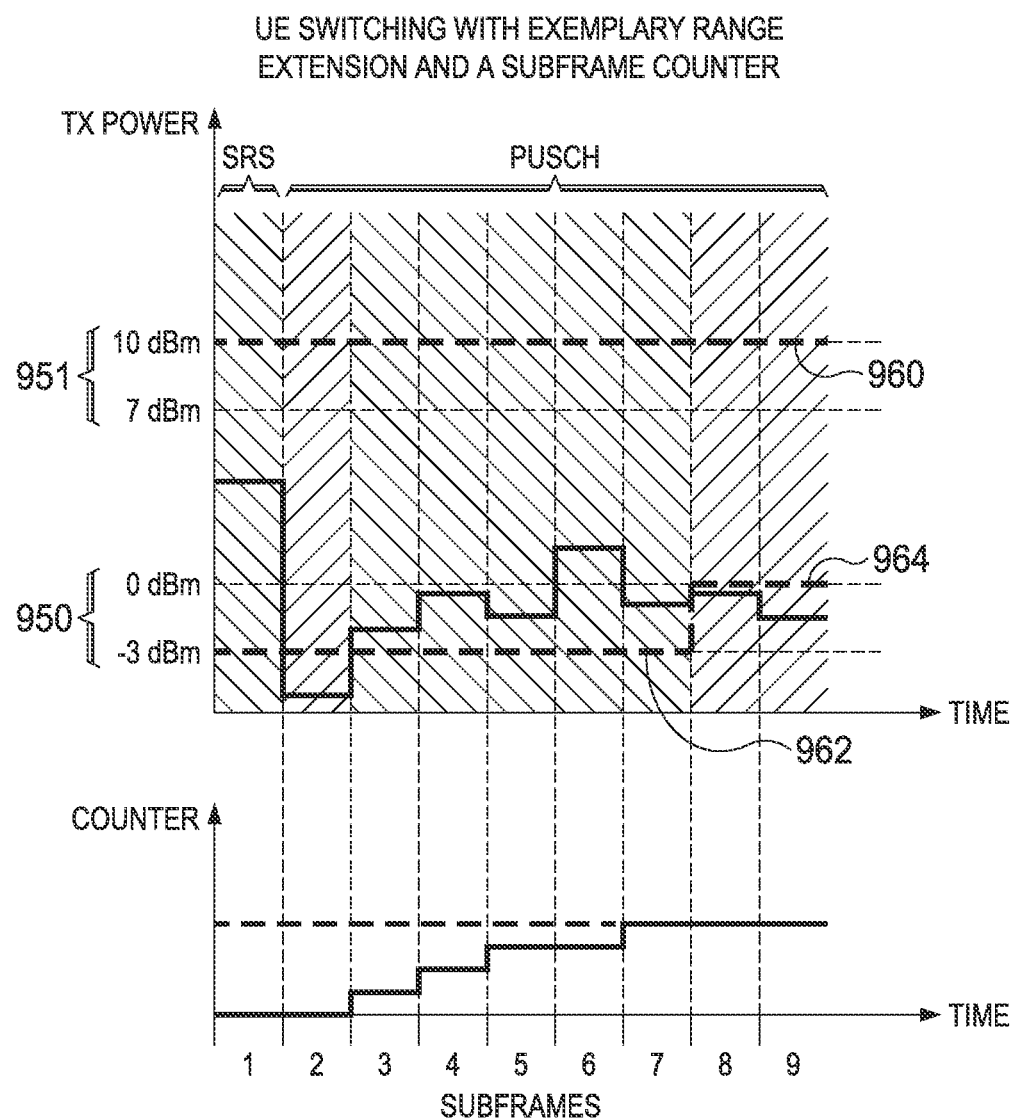
FIG. 12 illustrates UE mode switching with exemplary range extension and a subframe counter.

For example, as shown in FIG. 12, it is possible for circuitry or software within the UE or controller to count the subframes over which a UE operates in the lower hysteresis region between two consecutive SRS transmissions and prohibit further range extension once the number of subframes reaches a predefined threshold, e.g., 4 subframes in FIG. 12. More specifically, FIG. 12 depicts UE switching with exemplary range extension and a subframe counter. The subframe counter counts each PUSCH subframe having power operating within the lower hysteresis region and between two consecutive SRS transmissions. In this example, a first SRS transmission occurs at the first subframe and a next consecutive SRS transmission will occur after the ninth subframe. It is understood that the PUSCH transmission is not limited to only being nine subframes long, but instead can be much longer or shorter than this example. The counter in this example begins counting at PUSCH subframe 3 as the PUSCH transmission begins to operate within the lower hysteresis region 950. The counter counts the third, fourth and fifth subframes; Does not count the sixth subframe, which is not in the lower hysteresis region 950; And then counts the seventh subframe, which in this example brings the subframe count to the predefined threshold of 4 subframes. Upon reaching the threshold, the UE prohibits further range extension of the MPM and switches the mode to LPM with the LPM mode switching point set to the low default switching point between LPM and MPM 964, which in this example is 0 dBm, so that additional power consumption is not used within the extended lower hysteresis region 950. It is further noted that although RPD between SRS and PUSCH do not appear to be well mitigated in the remaining PUSCH subframes eight and nine, the power loss will be less than the power consumed by the selected mode with the higher power operating in a hysteresis region when the predefined threshold for the number of subframes is carefully selected.

It will be appreciated by those skilled in the art having the benefit of this disclosure that this method of setting UE mode switching for RPD reduction provides a device and method of mode switching that helps eliminate unnecessary mode switches and thereby alleviate, decrease or reduce RPD. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A User Equipment (UE) comprising:
a transmitter architecture adapted to transmit SRS transmissions and PUSCH transmissions;
a controller adapted to interact with and control the transmitter architecture to switch between a plurality of transmission power modes and to transmit each SRS transmission and PUSCH transmission while in at least one of the plurality of power modes;
wherein the SRS transmission comprises transmission of a portion of one subframe and the PUSCH transmission comprises transmission of a plurality of subframe portions,
and wherein the plurality of power modes comprises a Low Power Mode (LPM), a Mid Power Mode (MPM), and a High Power Mode (HPM);
wherein the controller is further adapted to select a reference mode from one of the plurality of power modes each time an SRS transmission occurs, the reference mode for transmitting the SRS is selected based on a power mode that the SRS transmission belongs to or is selected based on a predicted power mode that the PUSCH transmission following the SRS transmission will belong to;
wherein when the selected reference mode is LPM, the controller is adapted to control the transmitter architecture to switch the power mode at a low default switching point power level between LPM and MPM;
wherein when the selected reference mode is MPM, the controller is adapted to control the transmitter architecture to switch power modes at a low extended switching point power level between LPM and MPM and at a high default switching point power level between MPM and HPM;
and wherein when the selected reference mode is HPM, the controller is adapted to control the transmitter architecture to switch power modes at a high extended switching point power level between MPM and HPM,
and the controller is further configured to provide a subframe counter configured to count each PUSCH transmission subframe within a upper hysteresis region of the HPM and between two consecutive SRS transmissions;
wherein the upper hysteresis region of of the HPM is the power region between the high default switching point power level and the high extended switching point power level; the low extended switching point power level being lower than the low default switching point power level and the high extended switching point power level being lower than the high default switching point power level.

2. The UE of claim 1, wherein the predicted power mode that the PUSCH transmission following the present SRS transmission will operate in is based on PUSCH transmission history.

3. The UE of claim 1, wherein the reference mode is selected based on the predicted power mode that the PUSCH transmission that follows the present SRS transmission will operate in when the predicted power mode is different than the present power mode of the SRS transmission.

4. The UE of claim 1, wherein when the counter counts a predefined number of PUSCH subframes within the lower hysteresis region, then the reference mode is switched from MPM to LPM until a next SRS transmission.

5. The UE of claim 1, wherein when the counter counts a predefined number of PUSCH subframes within the upper hysteresis region, the reference mode is switched from HPM to MPM until a next SRS transmission.

6. The UE of claim 1, wherein the high default switching point power level is greater than the high extended switching point power level, which is greater than the low default switching point power level, which is greater than the low extended switching point power level.

7. In a UE device adapted to transmit SRS transmissions and PUSCH transmissions while in at least one of a plurality of power modes comprising a Low Power Mode (LPM), a Mid Power Mode (MPM), and a High Power Mode (HPM), a method of switching between the plurality of power modes comprising:
selecting, by the UE, a reference mode from one of the plurality of power modes each time an SRS transmission occurs, wherein selecting the reference mode further comprises:
selecting the reference mode based on a power mode that the SRS transmission belongs within; or
selecting the reference mode based on a predicted power mode that the PUSCH transmission following the SRS transmission will belong within;
wherein when the selected reference mode is LPM, switching the power mode by the UE at least at a low default switching point power level between LPM and MPM;
wherein when the selected reference mode is MPM, switching the power mode by the UE at least at a low extended switching point power level between LPM and MPM and at a high default switching power level between MPM and HPM, and counting, by the UE when the selected reference mode is MPM, a number of PUSCH transmission subframes that are within a lower hysteresis region and are between two consecutive SRS transmissions;
wherein the lower hysteresis region is defined by the power region between the low default switching point power level and the low extended switching point power level;
and wherein when the selected reference mode is HPM, switching the power mode by the UE at least at a high extended switching point power level between MPM and HPM;
wherein the high default switching point power level is greater than the high 25 extended switching point power level, which is greater than the low default switching point power level, which is greater than the low extended switching point power level.

8. The method of claim 7, wherein selecting the reference mode based on the predicted power mode that the PUSCH transmission following the occurring SRS transmission will belong within comprises using, by the UE, PUSCH transmission history to predict the predicted power mode that the PUSCH transmission following the occurring SRS transmission will belong within.

9. The method of claim 7, wherein selecting the reference mode further comprises selecting the reference mode based on the predicted power mode when the predicted power mode is different from the power mode that the SRS transmission belongs within.

10. The method of claim 7, wherein selecting the reference mode further comprises selecting the reference mode based on the power mode that the SRS transmission belongs within when the predicted power mode is the same as the power mode that the SRS transmission belongs within.

11. The method of claim 7, further comprising:
switching from MPM to LPM until a next SRS transmission when the number of counted PUSCH transmission subframes equals a predetermined number.

12. The method of claim 7, further comprising: counting, by the UE when the selected reference mode is HPM, a number of PUSCH transmission subframes that are within a upper hysteresis region and are between two consecutive SRS transmissions; wherein the upper hysteresis region is defined by the
power region between the high default switching point power level and the high extended switching point power level.

13. The method of claim 12, further comprising: switching from HPM to MPM until a next SRS transmission when the number of counted PUSCH transmission subframes equal a predetermined number.

14. A User Equipment (UE) comprising:
a transmitter architecture adapted to transmit SRS transmissions and PUSCH transmissions;
a controller adapted to interact with and control the transmitter architecture to switch between a plurality of transmission power modes and to transmit each SRS transmission and PUSCH transmission while in at least one of the plurality of power modes; wherein the plurality of power modes comprises a Low Power Mode (LPM), a Mid Power Mode (MPM), and a High Power Mode (HPM);
wherein the controller is further adapted to select a reference mode from one of the plurality of power modes each time an SRS transmission occurs, the reference mode for transmitting the SRS is selected based on a UE predicted power mode that the PUSCH transmission following the SRS transmission will belong to;
wherein when the selected reference mode is LPM, the controller is adapted to control the transmitter architecture to switch the power mode at a low default switching point power level between LPM and MPM;
wherein when the selected reference mode is MPM, the controller is adapted to control the transmitter architecture to switch power modes at a low extended switching point power level between LPM and MPM and at a high default switching point power level between MPM and HPM;
and wherein when the selected reference mode is HPM, the controller is adapted to control the transmitter architecture to switch power modes at a high extended switching point power level between MPM and HPM;
the low extended switching point power level being lower than the low default switching point power level and the high extended switching point power level being lower than the high default switching point power level.

15. In a UE device adapted to transmit SRS transmissions and PUSCH transmissions while in at least one of a plurality of power modes comprising a Low Power Mode
(LPM), a Mid Power Mode (MPM), and a High Power Mode (HPM), a method of switching between the plurality of power modes comprising:
selecting, by the UE, a reference mode from one of the plurality of power modes each time an SRS transmission occurs, wherein selecting the reference mode further comprises selecting the reference mode based on a predicted power mode that the PUSCH transmission following the SRS transmission will belong within; wherein when the selected reference mode is LPM, switching the power mode by
the UE at least at a low default switching point power level between LPM and MPM; wherein when the selected reference mode is MPM, switching the power mode by the UE at least at a low extended switching point power level between LPM and MPM and at a high default switching power level between MPM and HPM; and wherein when the selected reference mode is HPM, switching the power mode by
the UE at least at a high extended switching point power level between MPM and HPM; wherein the high default switching point power level is greater than the high extended switching point power level, which is greater than the low default switching point power level, which is greater than the low extended switching point power level.

16. A User Equipment (UE) comprising: a transmitter architecture adapted to transmit SRS transmissions and PUSCH transmissions; a controller adapted to interact with and control the transmitter architecture to
switch between a plurality of transmission power modes and to transmit each SRS transmission and PUSCH transmission while in at least one of the plurality of power modes; wherein the SRS transmission comprises transmission of a portion of one subframe and the PUSCH transmission comprises transmission of a plurality of subframe portions, and wherein the plurality of power modes comprises a Low Power Mode (LPM), a Mid Power Mode (MPM), and a High Power Mode (HPM);
wherein the controller is further adapted to select a reference mode from one of the plurality of power modes each time an SRS transmission occurs, the reference mode for transmitting the SRS is selected based on a power mode that the SRS transmission belongs to or is selected based on a predicted power mode that the PUSCH transmission
following the SRS transmission will belong to;
wherein when the selected reference mode is LPM, the controller is adapted to control the transmitter architecture to switch the power mode at a low default switching point power level between LPM and MPM; wherein when the selected reference mode is MPM, the controller is
adapted to control the transmitter architecture to switch power modes at a low extended switching point power level between LPM and MPM and at a high default switching point power level between MPM and HPM; and wherein when the selected reference mode is HPM, the controller is adapted to control the transmitter architecture to switch power modes at a high extended switching point power level between MPM and HPM, and the controller is further configured to provide a subframe counter configured to count each PUSCH transmission subframe within a upper hysteresis region of the HPM and between two consecutive SRS transmissions;

wherein the upper hysteresis region of the HPM is the power region between the high default switching point power level and the high extended switching point power level;

the low extended switching point power level being lower than the low default switching point power level and the high extended switching point power level being lower than the high default switching point power level.

17. In a UE device adapted to transmit SRS transmissions and PUSCH transmissions while in at least one of a plurality of power modes comprising a Low Power Mode (LPM), a Mid Power Mode (MPM), and a High Power Mode (HPM), a method of switching between the plurality of power modes comprising:

selecting, by the UE, a reference mode from one of the plurality of power modes each time an SRS transmission occurs, wherein selecting the reference mode further comprises: selecting the reference mode based on a power mode that the SRS transmission belongs within; or selecting the reference mode based on a UE predicted power mode that the PUSCH transmission, following the SRS transmission, will belong within; wherein when the selected reference mode is LPM, switching the power mode by the UE at least at a low default switching point power level between LPM and MPM;

wherein when the selected reference mode is MPM, switching the power mode by the UE at least at a low extended switching point power level between LPM and MPM and at a high default switching power level between MPM and HPM; and wherein when the selected reference mode is HPM, switching the power mode by the UE at least at a high extended switching point power level between MPM and HPM, and counting, by the UE when the selected reference mode is HPM, a number of PUSCH transmission subframes that are within an upper hysteresis region and are between two consecutive SRS transmissions; wherein the upper hysteresis region is defined by the power region between the high default switching point power level and the high extended switching point power level; wherein the high default switching point power level is greater than the high extended switching point power level, which is greater than the low default switching point power level, which is greater than the low extended switching point power level.

* * * * *